United States Patent [19]

Templeton

[11] Patent Number: 4,940,280

[45] Date of Patent: Jul. 10, 1990

[54] PROTECTION STRUCTURE FOR HEAVY EQUIPMENT

[75] Inventor: Darrel L. Templeton, Tempe, Ariz.

[73] Assignee: Hunter Contracting Company, Gilbert, Ariz.

[21] Appl. No.: 189,468

[22] Filed: May 2, 1988

[51] Int. Cl.⁵ ................... B60R 21/11; B62D 33/06
[52] U.S. Cl. ............................... 296/190; 296/102; 280/756
[58] Field of Search ................. 296/102, 190; 280/756

[56] References Cited

U.S. PATENT DOCUMENTS

| | | | |
|---|---|---|---|
| 2,805,887 | 9/1957 | Selby | 280/756 X |
| 3,549,170 | 12/1970 | Shankwitz | 296/102 X |
| 3,572,819 | 3/1971 | Moore et al. | 296/102 |
| 3,632,134 | 1/1972 | Babbitt et al. | 296/102 X |
| 3,704,030 | 11/1972 | McFerron | 296/102 X |
| 3,791,668 | 2/1974 | Adams | 296/102 X |
| 3,829,121 | 8/1974 | Ahrendt | 296/102 X |
| 3,993,346 | 11/1976 | Mounts | 296/96.2 |
| 4,060,261 | 11/1977 | Bauer et al. | 296/102 X |
| 4,184,712 | 1/1980 | Skahill | 296/190 |
| 4,260,320 | 4/1981 | Steiger | 296/102 X |
| 4,382,613 | 5/1983 | Haupt | 296/102 X |
| 4,392,669 | 7/1983 | Martin, Jr. | 180/89.12 X |

OTHER PUBLICATIONS

Montgomery Ward Farm Equipment Catalog, Aug. 1949, p. 37, "All Weather Tractor Cabs".
Caterpillar Brochure, Jan.-87.

*Primary Examiner*—Dennis H. Pedder
*Attorney, Agent, or Firm*—Don J. Flickinger; Jordan M. Meschkow; Lowell W. Gresham

[57] ABSTRACT

An apparatus for protecting the operator's compartment of a piece of heavy equipment in the event of a cave-in is interchangeable with the standard protective structure normally associated with the equipment for roll-over protection. The apparatus includes a plurality of upright and horizontal frame members for forming an enclosure around the operator's compartment. First and second upright frame members in the rear of the enclosure terminate with brackets which may be detachably coupled to the same brackets which secure the standard roll-over protective structure. The upright frame members are also secured to the floor of the operator's compartment by means of additional brackets. An overhead roof section is coupled to and supported by the upper region of the enclosure. The enclosure is provided with at least one side door and first and second escape hatches all of which are hingedly coupled to the enclosure and open outwardly only. The enclosure, doors and escape hatches are covered with expanded metal.

13 Claims, 2 Drawing Sheets

U.S. Patent  Jul. 10, 1990  Sheet 1 of 2  4,940,280
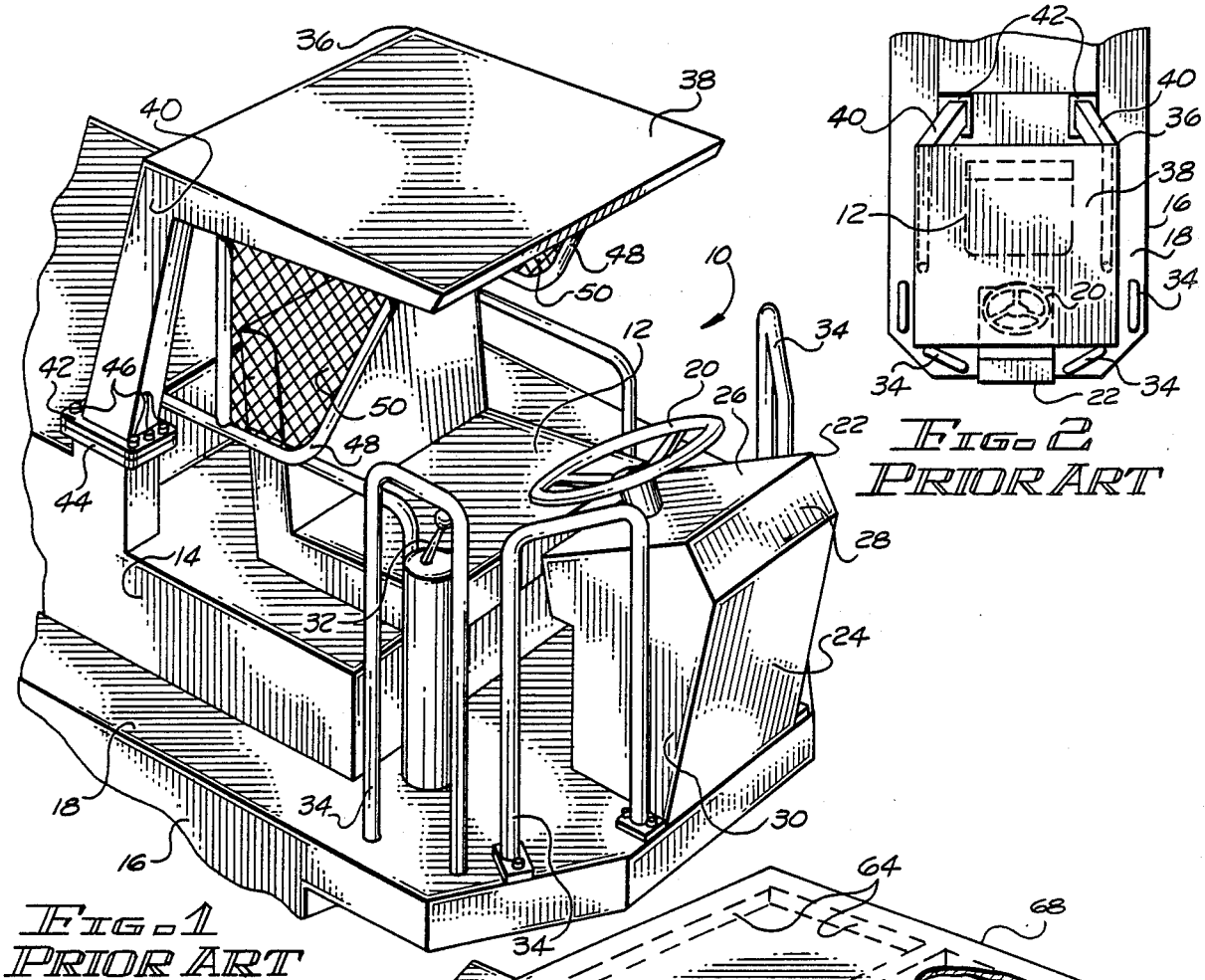
FIG-1 PRIOR ART
FIG-2 PRIOR ART
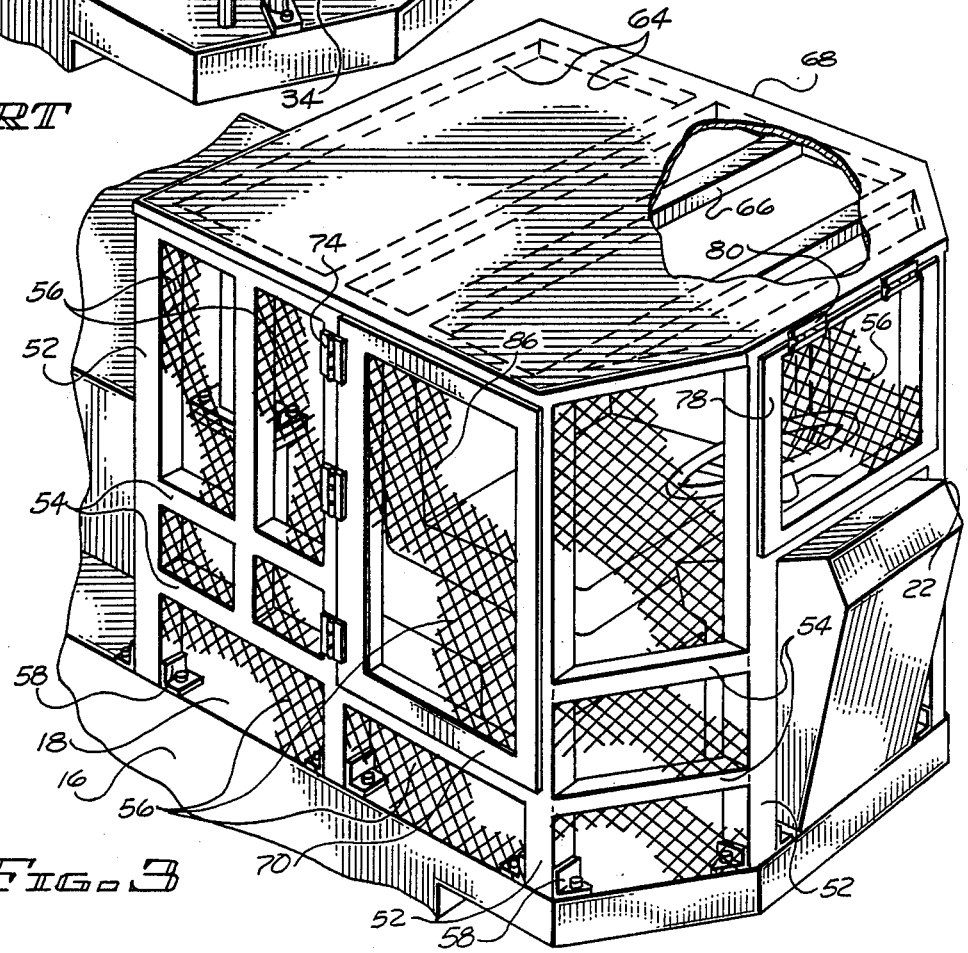
FIG-3

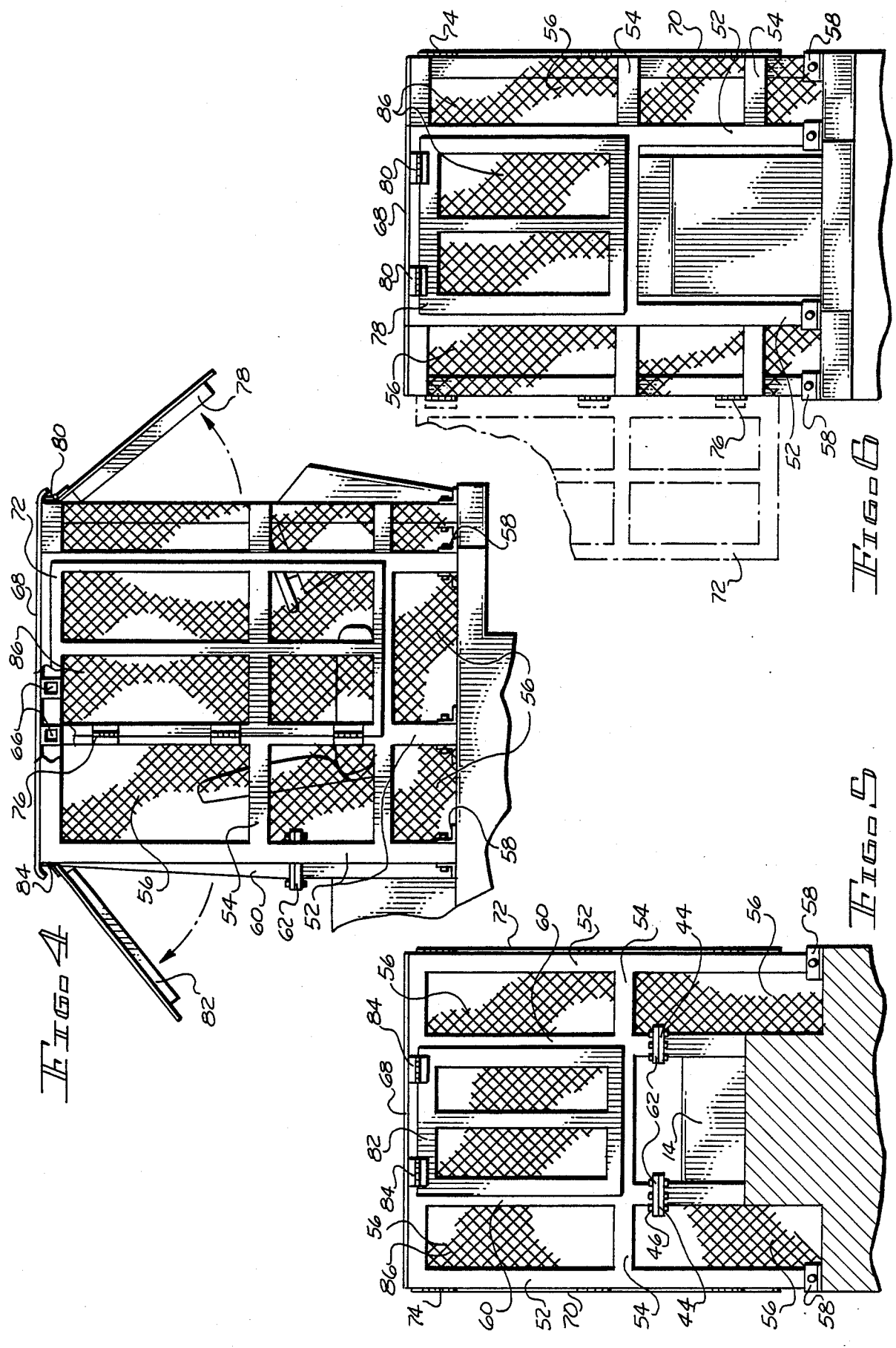

PROTECTION STRUCTURE FOR HEAVY EQUIPMENT

BACKGROUND OF THE INVENTION

This invention relates generally to heavy industrial equipment normally having roll-over protective apparatus associated therewith. More particularly, this invention relates to an improved operator's protective structure which may be removably secured to a piece of heavy equipment and which will protect the operator in the event that the piece of the equipment and the operator become buried.

Virtually all major construction projects are carried out, at least in part, with the use of heavy equipment. In recent years, federal regulations have mandated that such equipment be provided with some type of protective structure around the operator's compartment to protect the operator from injury should the vehicle be overturned. As a result, heavy equipment such as the CP-323 Virbratory Soil Compactor manufactured and made commercially available by Caterpillar Inc. is designed to include such protective apparatus.

In addition, there are many known examples of such protective apparatus and improvements thereto. For example, U.S. Pat. No. 4,184,712 discloses a plurality of demountable panels for enclosing the conventional roll-over structure associated with such heavy equipment. U.S. Pat. No. 3,632,134 discloses a protective plate supported by a frame over the operator's station, and U.S. Pat. No. 4,060,261 discloses an operator's enclosure fabricated of sheet metal, a portion of which is perforate.

Unfortunately, heavy equipment machines are often used in excavations which are deeper than the height of the equipment itself, and the prior art protective structures provide little protection should a cave-in occur burying the equipment and the operator.

SUMMARY OF THE INVENTION

It is an object of the present invention to provide an improved structure for protecting the operator of a piece of heavy equipment such as a compactor or backhoe.

It is a further object of the present invention that the improved protective apparatus be configured so as to be removably attached to the same brackets to which the standard protective structures are coupled.

It is a still further object of the present invention to provide an improved protective apparatus for use in conjunction with a piece of heavy equipment which will protect the operator thereof in the event that the equipment (and operator) become buried.

Yet another object of the present invention is to provide a protective structure for the operator of a piece of heavy equipment which will sustain life for several hours even though completely buried.

According to a broad aspect of the invention there is provided an apparatus for protecting the operator's compartment of a piece of heavy equipment. The operator's compartment interchangeably replaces a standard protective structure removably attached to the piece of heavy equipment by means of a pair of support brackets fixedly coupled to the equipment. The apparatus comprises a plurality of upright horizontal frame members for forming an enclosure around the operator's compartment. The enclosure has a front, a rear, and first and second sides. First and second brackets are fixedly coupled to the lower ends of first and second ones of the plurality of upright frame members for removable attachment to the pair of brackets. An overhead roof section is coupled to and supported by an upper region of the enclosure. At least a first door is pivotally coupled in the first side.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view of the cab portion of a piece of heavy equipment having coupled thereto a protective structure in accordance with the prior art;

FIG. 2 is a top view of the apparatus shown in FIG. 1;

FIG. 3 is a perspective view of the inventive structure for protecting the operator of a piece of heavy equipment;

FIG. 4 is a side view of the structure shown in FIG. 3;

FIG. 5 is a rear view of the apparatus shown in FIG. 3; and

FIG. 6 is a front view of the apparatus shown in FIG. 3.

DETAILED DESCRIPTION OF THE PREFERRED EMBODIMENT

FIGS. 1 and 2 illustrate the cab portion of a piece of heavy equipment in accordance with the teachings of the prior art. As can be seen, the operator's compartment 10 includes a seat 12 positioned on a support structure 14 which is turn fixedly positioned on a base 16 having an upper surface 18. A steering mechanism 20 protrudes upward from housing 22 having a front surface 24, an upper surface 26, an inclined surface 28, and first and second side surfaces 30 (only one of which is shown). An additional control mechanism 32 in the form of a lever is positioned proximate seat 12 so as to be within the operator's reach. A plurality of protective railings 34 are secured to and extend upward from base 16.

The operator's compartment is protected by a roll-over structure generally denoted 36. It comprises an overhead or roof portion 38 and first and second connecting arms 40 extending downward from opposite sides of the rear of overhead portion 38. Each of the arms 40 terminates in a flange 42 which matingly engages flange 44 which is in turn fixedly coupled to support structure 14. In this manner, protective apparatus 36 may be coupled to support structure 14 by means of bolts 46. Extending downward from each side of overhead 38 are side rails 48 each configured to form a frame for enclosing a section of wire mesh 50.

Protective apparatus 36 shown in FIGS. 1 and 2 does provide a measure of roll-over protection. Furthermore, wire mesh 50 will provide limited protection to the operator from debris falling into cab portion 10 from either side. However, it should be very clear that this structure would be of little help in the event of a cave-in burying the equipment and the operator. As can be seen, the operator's compartment is virtually open from the front, from the sides below mesh 50 and from the rear between arms 40. Thus, should a cave-in occur, earth and debris could easily enter the operator's compartment injuring the operator.

FIGS. 3, 4, 5 and 6 are perspective, side, rear and front views respectively of the inventive protective apparatus. As can be seen, each of the sidewalls comprises a plurality of vertical and horizontal supports (52 and 54 respectively) forming a plurality of openings 56. Vertical supports 52 are removably secured to the upper surface 18 of base 16 by means of a, for example, angle brackets 58.

As was stated previously, the roll-over protective apparatus shown in FIG. 1 included arms 40 which terminated with flanges 42. Flanges 42 are coupled to flanges 44 by means of bolts 46. Thus, roll-over structure 36 could be removed by simply removing bolts 46. The protective apparatus according to the invention as shown in FIGS. 3–6 simply replaces the roll-over structure 36 shown in FIG. 1.

Referring specifically to FIGS. 5 and 6, the rear portion of the protective structure includes vertical support members 60 which terminate with flanges 62. Flanges 62 are then secured to flanges 44 by means of bolts 46. Thus, the same attachment mechanism is used to secure the inventive protective structure as was used to secure the roll-over structure of FIG. 1. In this manner, when the piece of heavy equipment is being used above ground, it may be fitted with the type of protective apparatus shown in FIG. 1. If, however, the piece of heavy equipment will be used in excavations which are deeper than the height of the equipment, the equipment may be retrofitted with the inventive protective apparatus shown in FIGS. 3–6.

The inventive protective structure is provided with an overhead which comprises a peripheral frame 64 having a plurality of coplanar transverse strength members 66 fixedly coupled thereto. The resulting structure is then covered with a steel plate 68.

Referring to FIGS. 3, 4 and 6, the protective apparatus is provided with first and second framed side doors 70 and 72. Door 70 is coupled to a vertical frame member by means of hinges 74. Similarly, door 72 is coupled to a vertical frame member by means of hinges 76. For the safety of the operator, these doors only open outwardly and may be held closed by any one of a variety of mechanisms.

Referring to FIGS. 3, 4 and 6, it can be seen that the protective structure includes a forward framed escape window 78. As can be seen, this window is hingidly coupled to a central region of the forward portion of peripheral frame 64 by hinges 80. Similarly, referring to FIGS. 4 and 5, a second framed escape window 82 is pivotally coupled to a central region of the rear portion of peripheral frame 64 by hinges 84. Again, as was the case with doors 70 and 72, escape windows 78 and 82 open outward only for the protection of the operator in the event of a cave-in. Also, as was the case with doors 70 and 72, escape windows 78 and 82 may be maintained in a closed position by any one of a variety of mechanisms.

There has been described thus far a protective apparatus which completely surrounds the operator's compartment and includes sufficient openings so as not to significantly reduce the operator's visibility. Obviously however, should these openings remain open, the apparatus could not accomplish its intended objective in the event of a cave-in. Therefore, each opening including the framed windows and doors is covered with expanded metal. This will prevent earth and debris from entering the operator's compartment should a cave-in occur, but will provide good visibility during normal operation.

Thus, there has been provided an apparatus for protecting the operator's compartment of a piece of heavy machinery should the equipment including the operator become buried in a cave-in. The apparatus includes a plurality of upright and horizontal frame members. The lower edge of the rear upright frame members are secured to the preexisting support brackets. Additional brackets are affixed to the floor of the machine for receiving the lower ends of other upright members. The top of the structure is covered with a continuous steel plate while the sides are covered with expanded metal. Doors are provided on the sides of the structure and escape hatches are carried in both the front and the rear. The inventive protective structure which is especially devised to protect the operator during subterranean operation is interchangeably usable with a standard roll-over protection structure.

The above description is given by way of example only. Changes in form and details may be made by one skilled in the art without departing from the scope of the invention as defined by the appended claims.

I claim:

1. An apparatus for protecting the operator's compartment of a piece of heavy equipment of the type including
   a floor,
   an upstanding support structure raised above said floor, and
   a pair of flanges fixedly coupled to said support structure for removably attaching said support structure to a standard protective structure when said equipment is being used above ground,
   said apparatus for interchangeably replacing said standard protective structure when said equipment is used in excavations below ground level, said apparatus comprising:
   (a) a plurality of sidewalls for surrounding said operator's compartment, said sidewalls including
      (i) a first sidewall having
         (1) a first vertical support,
         (2) a second vertical support,
         (3) a third vertical support, and
         (4) at least one horizontal support;
      (ii) a second sidewall having
         (1) a first vertical support,
         (2) a second vertical support, and
         (3) at least one horizontal support;
      (iii) a rear sidewall having
         (1) a first vertical support,
         (2) a second vertical support, and
         (3) at least one horizontal support; and
      (iv) a front sidewall;
   (b) first and second brackets fixedly coupled to lower ends of said first and second vertical supports of one of said sidewalls for removably attaching said first and second vertical supports to said pair of flanges on said support structure;
   (c) an overhead roof section coupled to and supported by the upper edges of said sidewalls; and
   (d) a first door pivotally coupled in said first sidewall.

2. An apparatus according to claim 1, wherein said first and second vertical supports with said first and second brackets are in said rear sidewall.

3. An apparatus according to claim 1, wherein said apparatus includes a plurality of other vertical supports in addition to said first, second and third vertical supports, each of said other supports being detachably coupled to said floor.

4. An apparatus according to claim 1, comprising a second door pivotally coupled in said second sidewall.

5. An apparatus according to claim 1, comprising a first escape hatch pivotally coupled in said front sidewall.

6. An apparatus according to claim 5, further comprising a second escape hatch pivotally coupled in said rear sidewall.

7. An apparatus according to claim 6, wherein said sidewalls, said first door, and said first and second escape hatches each include at least one opening covered with expanded metal.

8. An apparatus according to claim 7, wherein said first door and said first and second hatches are hingedly coupled so as to open only outwardly.

9. An apparatus according to claim 8, wherein said overhead roof section is supported upon an upper peripheral frame, said peripheral frame having front and rear sections.

10. An apparatus according to claim 9, wherein said first hatch is hingedly coupled to a central region of the front section of said peripheral frame.

11. An apparatus according to claim 9, wherein said second hatch is hingedly coupled to a central region of the rear sections of said peripheral frame.

12. An apparatus according to claim 9, wherein said first door is hingedly coupled to one of said vertical supports.

13. An apparatus according to claim 4, wherein said second door is hingedly coupled to one of said vertical supports.

* * * * *